United States Patent
Elituv et al.

(10) Patent No.: US 10,681,878 B2
(45) Date of Patent: Jun. 16, 2020

(54) SYSTEM FOR CULTIVATING AQUATIC PLANTS AND METHOD THEREOF

(71) Applicant: Hinoman Ltd, Rishon LeZion (IL)

(72) Inventors: Ehud Elituv, Or Yehuda (IL); Itzhak Shalev, Beit-Gamliel (IL)

(73) Assignee: Hinoman Ltd., Rishon LeZion (IL)

( * ) Notice: Subject to any disclaimer, the term of this patent is extended or adjusted under 35 U.S.C. 154(b) by 314 days.

(21) Appl. No.: 15/754,902

(22) PCT Filed: Aug. 24, 2016

(86) PCT No.: PCT/IL2016/050925
§ 371 (c)(1),
(2) Date: Feb. 23, 2018

(87) PCT Pub. No.: WO2017/033190
PCT Pub. Date: Mar. 2, 2017

(65) Prior Publication Data
US 2018/0263200 A1    Sep. 20, 2018

Related U.S. Application Data

(60) Provisional application No. 62/209,353, filed on Aug. 25, 2015.

(51) Int. Cl.
*A01G 31/02* (2006.01)
*A01G 31/06* (2006.01)

(52) U.S. Cl.
CPC ............. *A01G 31/02* (2013.01); *A01G 31/06* (2013.01); *Y02P 60/216* (2015.11)

(58) Field of Classification Search
CPC ........ A01G 31/02; A01G 31/06; Y02P 60/216
See application file for complete search history.

(56) References Cited

U.S. PATENT DOCUMENTS

6,667,171 B2 * 12/2003 Bayless ............... B01D 53/84
                                                435/292.1
8,986,985 B2 * 3/2015 Levin ................... C12M 23/20
                                                435/289.1
(Continued)

FOREIGN PATENT DOCUMENTS

JP            S5678594 A      6/1981

OTHER PUBLICATIONS

International Search Report (PCT/IL2016/050925); dated Dec. 19, 2016.
(Continued)

*Primary Examiner* — Joshua D Huson

(57) ABSTRACT

The present invention discloses a system for cultivating surface-growing floating aquatic plants, in particular, duckweeks or lemnoideae species, on a non horizontally positioned sheet-like substrate. The aforementioned system comprises (a) a predetermined volume of growth media flowing through sheet-like substrate provided with a predetermined inoculum of said aquatic plants; (b) at least one sheet-like substrate; (c) an irrigation mechanism configured to a top down irrigation flow in said sheet-like substrate; and (d) a regulation mechanism configured to control said irrigation flow. The present invention further discloses methods for cultivating the aforementioned aquatic plants.

31 Claims, 2 Drawing Sheets

(56) References Cited

U.S. PATENT DOCUMENTS

| | | | | |
|---|---|---|---|---|
| 9,032,665 | B2* | 5/2015 | Whitney | A01G 31/02 47/59 R |
| 10,208,278 | B1* | 2/2019 | Curtis | C12M 31/10 |
| 2005/0055879 | A1 | 3/2005 | Darlington | |
| 2009/0007486 | A1* | 1/2009 | Corradi | A01G 31/02 47/62 R |
| 2010/0162621 | A1* | 7/2010 | Seebo | C12M 21/02 47/1.4 |
| 2011/0290202 | A1* | 12/2011 | Smith | C12N 1/12 123/3 |
| 2013/0115688 | A1* | 5/2013 | Fernandez Gonzalez | C12M 21/02 435/292.1 |
| 2013/0146741 | A1* | 6/2013 | Chou | F16M 13/022 248/550 |
| 2013/0160363 | A1 | 6/2013 | Whitney et al. | |
| 2013/0180166 | A1* | 7/2013 | Bayless | A01G 33/00 47/1.4 |
| 2013/0219788 | A1 | 8/2013 | VanLente | |
| 2014/0093950 | A1 | 4/2014 | Levin | |
| 2014/0127776 | A1* | 5/2014 | Picard | A01G 33/00 435/178 |
| 2014/0273174 | A1* | 9/2014 | Gross | C12N 11/14 435/257.1 |
| 2014/0290135 | A1* | 10/2014 | Carraro | A01G 7/06 47/57.7 |
| 2015/0234394 | A1* | 8/2015 | Shoham | C12M 29/06 700/283 |
| 2015/0250113 | A1* | 9/2015 | Shoham | A01G 31/02 47/62 R |
| 2015/0275161 | A1* | 10/2015 | Gressel | A01G 22/00 435/257.3 |
| 2016/0029579 | A1* | 2/2016 | Carscallen | A01G 7/045 47/62 R |
| 2016/0135380 | A1* | 5/2016 | Shoham | A01K 63/00 47/60 |
| 2016/0135397 | A1* | 5/2016 | Shoham | A01G 33/00 47/60 |
| 2016/0168521 | A1* | 6/2016 | Mottahedeh | C12M 21/02 435/257.1 |
| 2016/0338366 | A1* | 11/2016 | Elituv | A21D 13/04 |
| 2017/0006781 | A1* | 1/2017 | Shoham | A01G 31/02 |
| 2017/0006790 | A1* | 1/2017 | Shoham | A01G 31/02 |
| 2017/0127656 | A1* | 5/2017 | Bee | C02F 3/327 |
| 2018/0127794 | A1* | 5/2018 | Glukhman | C12P 19/42 |
| 2018/0201887 | A1* | 7/2018 | Gross | C12M 21/02 |
| 2018/0258287 | A1* | 9/2018 | Shalev | C09B 61/00 |
| 2018/0271041 | A1* | 9/2018 | Lovas | A01G 33/00 |
| 2018/0332776 | A1* | 11/2018 | O'Keefe | A01G 7/02 |
| 2019/0174689 | A1* | 6/2019 | Shoham | A01G 31/02 |

OTHER PUBLICATIONS

International Preliminary Report on Patentability (PCT/IL2016/050925); dated Sep. 28, 2017.

Leng et al., Duckweed—a potential high-protein feed resource for domestic animals and fish, Oct. 1995, 11 pages, vol. 7, No. 1, Centre for Duckweed Research & Development University of New England Armidale, NSW 2351.

Xiao et al., Culturing duckweed in the field for starch accumulation, Industrial Crops and Products, 2013, pp. 183-190, 48, Elsevier B.V.

Naumann et al., Growing microalgae as aquaculture feeds on twin-layers: a novel solid-state photobioreactor, J Appl Phycol, 2013 25: 1413-1420, Botanisches Institut, Lehrstuhl 1, Universitat zu Koln, Biozentrum Koln, Zulpicher Str. 47 b, 50674 Koln, Germany.

Doucha et al., Productivity, CO2/O2 exchange and hydraulics in outdoor open high density microalgal (*Chlorella* sp.) photobioreactors operated in a Middle and Southern European climate, Journal of Applied Phycology, Dec. 2006 18: 811-826, Laboratory of Cell Cycles and Microalgal Biotechnology, Institute of Microbiology, Academy of Sciences of the Czech Republic, 379 81 Tfebon, Czech Republic.

Toyama et al., Enhanced photosynthesis, biomass production and nutrient uptake of duckweeds by plant growth-promoting bacterium, *Sinorhizobium* sp. SP4, The Second International Conference on Duckweed Research and Applications, Aug. 23, 2013, 42 pages.

* cited by examiner

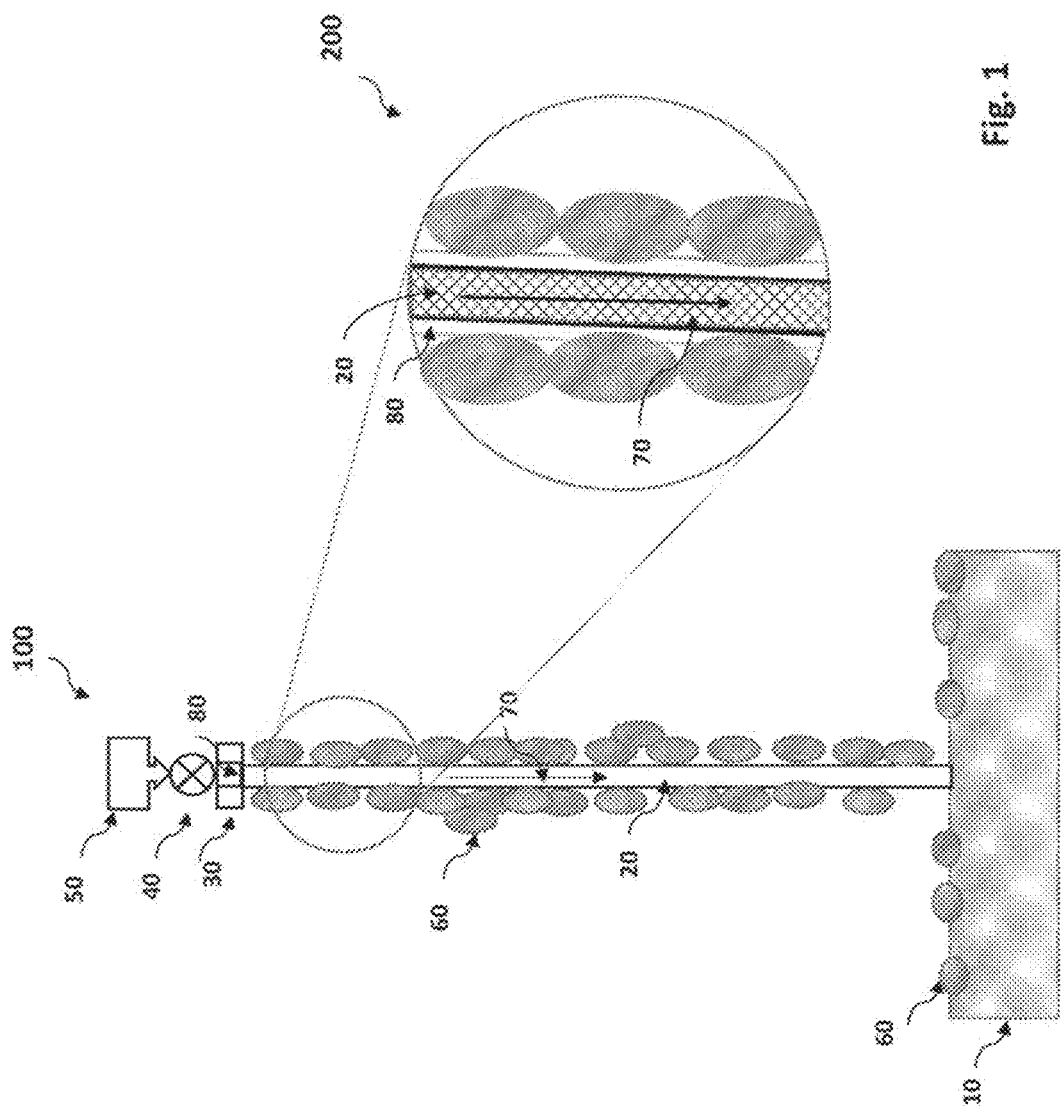
Fig. 1
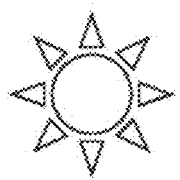

SYSTEM FOR CULTIVATING AQUATIC PLANTS AND METHOD THEREOF

CROSS-REFERENCE TO RELATED APPLICATIONS

The present application is a U.S. National Stage of International Patent Application No. PCT/IL2016/050925, filed on Aug. 24, 2016, which claims priority to and all the benefits of U.S. Provisional Patent Application Ser. No. 62/209,353, filed on Aug. 25, 2015, both disclosures of which are hereby incorporated by reference in their entirety.

FIELD OF THE INVENTION

The present invention generally relates to a system and method for cultivating surface-floating aquatic plants on sheet-like substrates. In particular, it relates to a system and method for growing duckweeds or Lemnoideae species.

BACKGROUND OF THE INVENTION

Duckweeds are flowering aquatic plants which float on or just beneath the surface of still or slow-moving bodies of fresh water and wetlands. They arose from within the arum or aroid family (Araceae), often are classified as the subfamily Lemnoideae within the Araceae. Classifications created prior to the end of the 20 th century classify them as a separate family, Lemnaceae. The flower of the duckweed genus *Wolffia* is the smallest known, measuring merely 0.3 mm long.

Duckweeds have received research attention because of their great potential to remove mineral contaminants from waste waters emanating from sewage works, intensive animal industries or from intensive irrigated crop production. Duckweeds need to be managed, protected from wind and maintained at an optimum density to obtain optimal growth rates. One traditional use of Duckweeds is as a vegetable foodstuff. In many parts of the world, Duckweeds are consumed by domestic and wild (fowl, fish, herbivorous animals and humans). The smallest of duckweeds (of the *Wolffia* genera) has been used as a nutritious vegetable by Burmese, Laotians, and the people of northern Thailand for generations. Duckweed makes a fine addition to a salad and is quite tasty.

Duckweeds (most of genera species) comparatively to other aquatic plants, even the terrestrial, have a high binding capacity (fixation) of various minerals (cations and anions) from their growth medium. This property is exploited for cleaning water supplies (water depollution) but at the same time, this property constitutes a major restriction to use such plants as a source for human food alternative unless the cultivation environment is tightly controlled.

Symbiotic duckweed-bacteria cultures have been used to improve wastewater treatment and starch-biomass production from wastewater (production of energy/chemical feedstock) by duckweed. (http://duckweed2013.rutgers.edu/presentations/16_toyama_tadashi.pdf). JP patent pub no. S6352960 teaches fermentation of alcohol from a starch forming plant body, by cultivating a photosynthetic bacterium and microalga in an organic waste liquor, adding a rotifer and a water flea to the resultant growth liquid, cultivating *Wolffia* and duckweed in the presence thereof with the food chain between them, and utilizing the starch forming ability of the duckweeds, in particular, *Wolffia*.

The natural habitat of duckweed is floating freely on the surface of fresh or brackish water sheltered from wind and wave action by surrounding vegetation. The most favorable circumstance is water with decaying organic material to provide duckweed with a steady supply of growth nutrients and trace elements. A dense cover of duckweed shuts out light and inhibits competing submerged aquatic plants, including algae.

Duckweed fronds are not anchored in soil, but float freely on the surface of a body of water. *Wolffia* fronds are oblate spheroid shaped with no visible roots or leaves. They can be dispersed by fast currents or pushed toward a bank by wind and wave action. If the plants become piled up in deep layers the lowest layer will be cut off from light and will eventually die. Plants pushed from the water onto a bank will also dry out and die. Disruption of the complete cover on the water's surface permits light intrusion and the growth of algae and other submerged plants that can become dominant and inhibit further growth of a duckweed colony. The most rapid reproductive rate occurs when the plant is at a surface concentration on 100 grams per square meter. Homogeneous dispersion, including stacking up to 20 layers, may occur at up to 700 grams per square meter. Initially, small clusters are formed held together by capillary forces. These merge into a continuous layer which can then stack to several layers.

Duckweed plants can double their mass in two to eight days under a variety of conditions of nutrient availability, sunlight, and temperature. This is faster than almost any other higher plant. Average growth rates of unmanaged colonies of duckweed will be reduced by a variety of stresses: nutrient scarcity or imbalance; toxins; extremes of pH and temperature; crowding by overgrowth of the colony; and competition from other plants for light and nutrients.

To cultivate duckweed a grower needs to organize and maintain conditions that mimic the natural environmental niche of duckweed: a sheltered, pond-like culture plot and a constant supply of water and nutrients from organic or mineral fertilizers.

The system for cultivation of aquatic plants, for example, a cultivation pond, a raceway type cultivation apparatus, a tubular type cultivation system, a liquid membrane-forming cultivation system have been well known. However, there are various shortfalls in these cultivation systems, such as requiring large water body area, expensive leveling of large areas, potential for contamination of the water, energy intensive water circulation of large amounts of water volumes, accumulation of toxins in the older plants residing in the water for protracted times, low yield due to overcrowding, inefficient use of light energy per unit of cultivation surface area, difficult to implement as mass production due to access limitations, harvesting difficulties et al. Transferring cultivation of a surface floating species to a solid non horizontal substrate is non intuitive and is particularly difficult because the duckweed does not anchor itself to a substrate but rather floats, which would cause it to fall off a non horizontal substrate when subjected to water shear flow forces occurring parallel to the substrate surface. Furthermore, if cultivating the *Wolffia* for human nutrition or other purpose where the objective of cultivation is for the harvested *Wolffia* to consistently comply with certain chemical composition requirements, then the non-horizontal cultivation would present difficulties in supplying the tiny plant proper nourishment both in terms of nutrient and of lighting conditions to avoid highly fluctuating composition, including of undesired trace elements and harmful microbiological infestation.

In view of the above, there is still a long felt need to address the challenges of solid substrate cultivation systems and methods for cultivating surface-floating plants, in particular, duckweeds in an efficient, low cost, controlled plant quality, space-saving and high yield manner.

SUMMARY OF THE INVENTION

It is therefore one object of the present invention to disclose a system for cultivating surface-floating aquatic plants on a sheet-like substrate, characterized by: (a) a predetermined volume of growth media flowing through a sheet-like the substrate provided with a predetermined inoculum of said aquatic plants; (b) at least one sheet-like substrate defined below; (c) an irrigation mechanism for providing a top down irrigation flow in said sheet-like substrate; and (d) a regulation mechanism for controlling said irrigation flow; wherein said at least one said sheet-like substrate is arranged non horizontally on at least one supporting structure.

It is a further object of the present invention to disclose a method for cultivating surface-growing aquatic plants on a sheet-like substrate, comprising steps of:
  a. providing a predetermined volume of growth media flowing through sheet-like substrate provided with a predetermined inoculum of said aquatic plants;
  b. providing at least one sheet-like substrate;
  c. providing a top down irrigation flow in said sheet-like substrate via an irrigation mechanism; and
  d. providing a regulation mechanism configured to control said irrigation flow;
    wherein said at least one said sheet-like substrate is arranged non horizontally to the ground, containing said predetermined volume of growth media on at least one supporting structure.

It is a further object of the present invention to disclose a system for cultivating surface-growing floating aquatic plants on a non horizontally positioned sheet-like substrate, characterized by:
  a) a predetermined volume of growth media flowing through sheet-like the substrate provided with a predetermined inoculum of said aquatic plants;
  b) at least one sheet-like substrate;
  c) an irrigation mechanism configured to a top down irrigation flow in said sheet-like substrate; and
  d) a regulation mechanism configured to control said irrigation flow;
    wherein said at least one sheet-like substrate is arranged non horizontally to the ground, containing said predetermined volume of growth media on at least one supporting structure.

It is a further object of the present invention to disclose the system as defined in any of the above, wherein said aquatic plants are Lemnoideae genus selected from the group consisting of: *Landoltia, Lemna, Spirodela, Wolffia, Wolffiella* and any combination thereof.

It is a further object of the present invention to disclose the system as defined in any of the above, wherein said aquatic plants are *Wolffia* species selected from the group consisting of: *Wolffia angusta, Wolffia arrhiza, Wolffia australiana, Wolffia borealis, Wolffia brasiliensis, Wolffia Columbiana, Wolffia cylindracea, Wolffia elongate, Wolffia globose, Wolffia microscopica, Wolffia neglecta* and any combination thereof.

It is a further object of the present invention to disclose the system as defined in any of the above, wherein said predetermined volume of growth media is the equilibrium absorption of the sheet-like substrate.

It is a further object of the present invention to disclose the system as defined in any of the above, wherein said irrigation mechanism supplies growth media at a rate not exceeding 10 complete equilibrium absorption volumes per hour.

It is a further object of the present invention to disclose the system as defined in any of the above wherein the aquatic plant is seeded on the sheet-like substrate.

It is a further object of the present invention to disclose the system as defined in any of the above, wherein time between seeding and harvesting of said aquatic plants is in a range of 2 to 30 days.

It is a further object of the present invention to disclose the system as defined in any of the above, wherein growth media consumption of said aquatic plants is in a range of 500 to 10,000 L/kg of harvest biomass.

It is a further object of the present invention to disclose the system as defined in any of the above, wherein rate of said top down irrigation flow is in a range of 0.5 to 10 liter/h/m2.

It is a further object of the present invention to disclose the system as defined in any of the above, further comprising at least one analyzing means to measure at least one physical or chemical property of said volume of growth media.

It is a further object of the present invention to disclose the system as defined in any of the above, wherein said analyzing means is connected to said volume of growth media in ways selected from the group consisting of in-line, on-line, at-line, off-line and any combination thereof.

It is a further object of the present invention to disclose the system as defined in any of the above, wherein said at least one analyzing means is selected from the group consisting of pH meter, conductivity sensor, thermometer, liquid chromatography (LC), high performance liquid chromatography (HPLC), colorimeter, turbidity meter, UV-Vis, gas chromatography (GC), mass spectrometer (MS) and any combination thereof.

It is a further object of the present invention to disclose the system as defined in any of the above, wherein said at least one physical or chemical property is selected from the group consisting of pH, conductivity, temperature, transmittance, urea concentration, total ammonia concentration, mineral concentration, nitrate concentration, total dissolved solids (TDS), total suspended solids (TSS), turbidity, biomass of said aquatic plants and any combination thereof.

It is a further object of the present invention to disclose the system as defined in any of the above, wherein said sheet-like substrate comprises a panel.

It is a further object of the present invention to disclose the system as defined in any of the above, wherein size of said substrate panel is 0.2 to 6 m in width and 0.2 to 6 m in height.

It is a further object of the present invention to disclose the system as defined in any of the above, wherein said substrate is selected from the group consisting of fibrous matts, nonwoven fabrics, woven fabrics, braided fabrics, warp knitted fabrics, weft knitted fabrics, netting, open cell foams, semipermeable membranes and compound structures composed of several layers of the abovementioned substrates and any combination thereof.

It is a further object of the present invention to disclose the system as defined in any of the above, wherein said fiber in said fabric is selected from the group consisting of are polyester, polyamide, polyolefin, cotton, rayon, bast fibers, polylactic acid, acrylic or polyurethane and any combination thereof.

It is a further object of the present invention to disclose the system as defined in any of the above, wherein fineness of said fiber in said substrate is in a range of 1 to 5000 dTex.

It is a further object of the present invention to disclose the system as defined in any of the above, wherein area weight of said substrate is in a range of 20 to 500 g/m$^2$.

It is a further object of the present invention to disclose the system as defined in any of the above, wherein thickness of said substrate is in a range of 0.1 mm-20 mm.

It is a further object of the present invention to disclose the system as defined in any of the above, wherein average pore size of said fabric is in a range of 100-2000 μm.

It is a further object of the present invention to disclose the system as defined in any of the above, wherein seeding density of said aquatic plants on each side of said fabric is in a range of 100 to 2000 g/m$^2$.

It is a further object of the present invention to disclose a method for cultivating surface-growing floating aquatic plants on a sheet-like substrate, comprising the steps of:

a. providing a predetermined volume of growth media flowing through sheet-like substrate provided with a predetermined inoculum of said aquatic plants;

b. providing at least one sheet-like substrate;

c. providing a top down irrigation flow in said sheet-like substrate via an irrigation mechanism; and d. providing a regulation mechanism configured to control said irrigation flow; wherein said at least one sheet-like substrate is arranged non horizontally to the ground, containing said predetermined volume of growth media on at least one supporting structure.

It is a further object of the present invention to disclose the method as defined above, wherein said aquatic plants are Lemnoideae genus selected from the group consisting of: *Landoltia, Lemna, Spirodela, Wolffia, Wolffiella* and any combination thereof.

It is a further object of the present invention to disclose the method as defined in any of the above, wherein said aquatic plants are *Wolffia* species selected from the group consisting of: *Wolffia angusta, Wolffia arrhiza, Wolffia australiana, Wolffia borealis, Wolffia brasiliensis, Wolffia Columbiana, Wolffia cylindracea, Wolffia elongate, Wolffia globose, Wolffia microscopica, Wolffia neglecta* and any combination thereof.

It is a further object of the present invention to disclose the method as defined in any of the above, wherein said predetermined volume of growth media is the equilibrium absorption of the sheet-like substrate.

It is a further object of the present invention to disclose the method as defined in any of the above, wherein said irrigation mechanism supplies growth media at a rate not exceeding 10 complete equilibrium absorption volumes per hour.

It is a further object of the present invention to disclose the method as defined in any of the above, wherein the aquatic plant is seeded on the sheet like substrate.

It is a further object of the present invention to disclose the method as defined in any of the above, wherein time between seeding and harvesting of said aquatic plants is in a range of 2 to 30 days.

It is a further object of the present invention to disclose the method as defined in any of the above, wherein consumption of growth media of said aquatic plants is in a range of 500 to 10,000 L/kg of harvest biomass.

It is a further object of the present invention to disclose the method as defined in any of the above, wherein rate of said top down irrigation flow is in a range of 0.5 to 10 liter/h/m2.

It is a further object of the present invention to disclose the method as defined in any of the above, further comprising a step of providing at least one analyzing means to measure at least one physical or chemical property of said volume of growth media.

It is a further object of the present invention to disclose the method as defined in any of the above, wherein said analyzing means is connected to said volume of growth media in ways selected from the group consisting of in-line, on-line, at-line, off-line and any combination thereof.

It is a further object of the present invention to disclose the method as defined in any of the above, wherein said at least one analyzing means is selected from the group consisting of pH meter, conductivity sensor, thermometer, liquid chromatography (LC), high performance liquid chromatography (HPLC), colorimeter, turbidity meter, UV-Vis, gas chromatography (GC), mass spectrometer (MS) and any combination thereof.

It is a further object of the present invention to disclose the method as defined in any of the above, wherein said at least one physical or chemical property is selected from the group consisting of pH, conductivity, temperature, transmittance, urea concentration, total ammonia concentration, mineral concentration, nitrate concentration, total dissolved solids (TDS), total suspended solids (TSS), turbidity, biomass of said aquatic plants and any combination thereof.

It is a further object of the present invention to disclose the method as defined in any of the above, wherein said sheet-like substrate comprises a panel.

It is a further object of the present invention to disclose the method as defined in any of the above, wherein size of said substrate panel is 0.2 to 6 m in width and 0.2 to 6 m in height.

It is a further object of the present invention to disclose the method as defined in any of the above, wherein said substrate is selected from the group consisting of fibrous matts, nonwoven fabrics, woven fabrics, braided fabrics, warp knitted fabrics, weft knitted fabrics, netting, open cell foams, semipermeable membranes and compound structures composed of several layers of the abovementioned substrates and any combination thereof.

It is a further object of the present invention to disclose the method as defined in any of the above, wherein said fiber in said fabric is selected from the group consisting of polyester, polyamide, polyolefin, cotton, rayon, bast fibers, polylactic acid, acrylic or polyurethane and any combination thereof.

It is a further object of the present invention to disclose the method as defined in any of the above, wherein fineness of said fiber in said fabric is in a range of 1 to 5000 dTex.

It is a further object of the present invention to disclose the method as defined in any of the above, wherein area weight of said fabric is in a range of 20 to 500 g/m$^2$.

It is a further object of the present invention to disclose the method as defined in any of the above, wherein thickness of said fabric is in a range of 0.1 mm-20 mm.

It is a further object of the present invention to disclose the method as defined in any of the above, wherein average pore size of said fabric is in a range of 100-2000 μm.

It is a further object of the present invention to disclose the method as defined in any of the above, wherein seeding density of said aquatic plants on each side of said fabric is in a range of 100 to 2000 g/m$^2$.

BRIEF DESCRIPTION OF THE FIGURES

For a better understanding of the invention and to show how the same may be carried into effect, various embodiments are herein described, by way of example only, with reference to the accompanying drawings, wherein:

FIG. 1 is a schematic representation of a cross section view of a cultivating system of surface-growing aquatic plants in accordance with an embodiment of the present invention; and FIG. 2 including 2A to 2C, and 2D are schematic representations of fabric panels on which aquatic plants are growing.

DETAILED DESCRIPTION OF THE PREFERRED EMBODIMENTS

Figure 2D:
FIG. 2D is a photo of cross section of a spacer fabric.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

As used herein the term "about" or "approximately" denotes ±25% of the defined amount or measure or value.

The term "biomass" refers hereinafter to biological material derived from living organisms, in the present invention, aquatic plants in a fresh form containing about 96% moisture.

The term "duckweeds" refers hereinafter to flowering aquatic plants which float on or just beneath the surface of water and wetlands. They belong to the family Araceae and therefore, often are classified as the subfamily Lemnoideae within the Araceae. Classifications created prior to the end of the 20 th century classify them as a separate family, Lemnaceae.

The term "surface-growing floating aquatic plants" or "surface-growing aquatic plants" or "floating aquatic plants" or "surface-floating aquatic plants" hereinafter refer to aquatic plants living at the water's surface or floating on the water surface or partially immersed in water. The aforementioned terms further refer to aquatic plants that float on or just beneath the surface of still or slow-moving bodies of fresh water or wetlands.

The term "analyzing means" hereinafter refers to any apparatus for measuring physical or chemical properties of a substance. Any means known in the art for measurement of selected physical and/or chemical properties of the predetermined volume of growth media may be used.

The term "growth media" hereinafter refers to water containing a predetermined amount of nutrients and other additives required for plant growth.

The term "equilibrium absorption" hereinafter refers to the volume of water that a sheet-like substrate can retain without dripping.

Duckweed species are small floating aquatic plants found worldwide and often seen growing in thick, blanket-like mats on still, nutrient-rich fresh and brackish waters. They are monocotyledons belonging to the botanical family Lemnaceae and are classified as higher plants, or macrophytes, although they are often mistaken for algae [Skillicorn P. et al. 1993].

There are four most known genera species of duckweeds family:

1. *LEMNA* (*L. gibba; L. disperna; L gibba; L japonica; L minima; L mino; L minuscula; L paucicostata; L perpusilla; L polyrrhiza; L turionifera; L. trisulca; L valdiviana*);

2. *SPIRODELA* (*S. biperforata; S. intermedia; S. oligorrhiza; S. polyrrhiza; S. punctata*);

3. *WOLFFIA* (*W. arrhiza; W. australiana; W. columbiana; W. microscopia; W. neglecta, Wolffia angusta, Wolffia borealis, Wolffia brasiliensis, Wolffia cylindracea, Wolffia elongata, Wolffia globosa* and *Wolffia microscopica*);

4. *WOLFFIELLA* (*W. caudate; W. denticulate; W. lingulata; W. oblonga; W. rotunda*).

The present invention is intended to disclose a space-saving, water transport efficient, light energy efficient, high precision nutrition, food quality, consistent growth and high yield system for cultivating aquatic plants naturally growing on the horizontal surface of a body of water and normally deriving their nutrition from said water which may be slow moving. Transferring the cultivation to a solid substrate where the plant is stationary and the water is dynamic, is accomplished by special arrangement of sheet-like substrates on which the aquatic plants grow and the regulation of the flow and content of the irrigating medium. The sheets are made of well-defined fabrics, foams or other porous structures, which enable formation, maintenance and regulation of a replenish-able, homogeneous thin layer of water on their surface for adhesion, nutrition and growth of the aquatic plants. Water and nutrients for cultivating aquatic plants are supplied by an irrigation mechanism. The irrigation flow mechanism provides irrigation flow in the sheet-like substrate, which is controlled by a regulation mechanism. The regulation mechanism regulates the irrigation flow rate so that the aquatic plants stay adhering to the sheet-like substrate albeit having no root nor other inherent mechanism to defy gravity other than capillary forces, and continue to have most efficient, consistent, supply of nutrients and light energy. This is enabled, against gravity and in compliance with requirements for economically viable, yet well composition controlled, consistent, mass yield, through well-defined aggregated cultivation condition tailored to leverage both Lemnaceae's tiny mass (especially preferred species: *Wolffia*)—and capillary forces of water when administered through porous material in an controlled environment as defined under the present invention. The non-horizontal arrangement allows for penetration of more light per unit growth area compared to a horizontal body of water.

The system and method disclosed herein are suitable for surface-floating aquatic plant, which may comprise any member of Lemnaceae family. Preferred are the plants of the genus *Wolffia*. The plant component *Wolffia*, which is the preferred object of present invention, has characteristics that meet the requirements of chemical purity for a foodstuff, being grown in aquatic culture farm of Agro-industrial Company HINOMAN Ltd, in conditions of controlled growth (e.g. chemical composition of the nutrient media, lighting and protection from outside contamination), in the form of fresh green vegetable. In the ideal condition, the biomass of duckweeds can double in two to eight days. Generally the time between seeding and harvesting of duckweeds is in a range of 2 to 30 days.

Reference is now made to FIG. 1, which shows a cross section view of an embodiment of the system for cultivating surface-floating aquatic plants on a non horizontal sheet-like substrate. In this embodiment, the system (100) comprises a runoff collection tank (10), a sheet like substrate (20) supporting a predetermined inoculum of aquatic plants (60), which are duckweeds or selected species of Lemnoideae, a supporting structure for the sheet-like substrates (30), an irrigation mechanism (40) configured to a top down irrigation flow (70) in said sheet-like substrate and a regulation mechanism (50) configured to control said irrigation flow (70). The sheet-like substrate (20) is arranged non horizontally on the supporting structure (30). Improper conditions will result in the aquatic plants to detach and fall disadvantageously into the runoff collection tank (10).

Reference is now made to a magnification of a portion of the system for cultivating surface-floating aquatic plants (200). The sheet like substrate (20) is a porous structure capable of capillary transport of water in its bulk and on its surface creating a continuous surface water film (80). Examples of such structures are fibrous matts, nonwoven fabrics, woven fabrics, braided fabrics, warp knitted fabrics, weft knitted fabrics, netting, open cell foams, semipermeable membranes and compound structures composed of several layers of the abovementioned substrates. Areal weight of said substrates is from 20 to 500 gr/sq. meter. Thickness is 0.1 to 20 mm. Average pore size of 100-2000 micrometers. Porosity (the ratio of void space within the boundaries of solid material to the total volume of solid material, including void spaces) is 0.6 to 0.98. Fiber or foam constituent materials are polyester, polyamide, polyolefin, cotton, rayon, bast fibers, polylactic acid, acrylic or polyurethane or mixtures thereof.

Fiber fineness is 1 to 5000 dTex. Capillarity as measured by the vertical strip method (e.g. The American Association of Textile Chemists and Colorists (AATCC) Test Method 197-2011, Vertical Wicking of Textiles) is wicking height of 2 mm to 150 mm and vertical wicking rate is 0.2 to 20 mm/sec.

The supporting structure (30) may be interconnected to a gantry or frame for moving in x, y, z coordinates automatically or manually in a predetermined manner. The irrigation flow mechanism (40) provides a top down irrigation flow (70) in the sheet-like substrate (20), which is controlled by a regulation mechanism (50). The regulation mechanism regulates the irrigation flow rate in a range of 0.5 to 10 L/hr/m$^2$ resulting in up to 10 complete replacements of the equilibrium absorption volume of liquid in the substrate per hour, so that the aquatic plants (60) stay adhering to the sheet-like substrate (20) and have most efficient utilization of nutrients and light energy. Consumption of the growth media (10) of the aquatic plants is in a range of 500 to 10,000 L/Kg of harvest biomass. Lighting intensity is in a range of 3,000 to 10,000 lux.

Duckweed species are robust in terms of survival, but sensitive in terms of thriving and their composition. They can survive and recover from extremes of temperature, nutrient loadings, nutrient balance, and pH. However, for duckweed to thrive these four factors need to be balanced and maintained within reasonable limits. For example, pH is best to be maintained over the range of 6.5-7.5 and temperature should be between 16 to 28° C. Average growth rates of unmanaged colonies of duckweed will be reduced by a variety of stresses: nutrient scarcity or imbalance; toxins; extremes of pH and temperature; crowding by overgrowth of the colony; and competition from other plants for light and nutrients. Crop management of duckweeds is concerned with when to fertilize, irrigate, harvest, and buffer; how much to fertilize and to harvest; and with which nutrients to supply. Good crop management will maintain a complete and dense cover of duckweed, mid-range pH and balanced nutrients. Analyzing the runoff water in (10) provides a way to monitor the condition of the growth media and furthermore it can send the result of measurement to a feedback mechanism to regulate the irrigation (40) once measured physical or chemical properties of the growth media deviate from the desirable growth conditions for the aquatic plants. The feedback information is used to regulate concentrations of fertilizers and nutrients in given volume of growth media. It also includes means to detoxify the growth media, restore pH and temperature. The analysis may be selected from the group consisting of in-line, on-line, at-line, off-line and any combination thereof. To monitor condition of the growth media, the physical or chemical property to be measured is selected from the group consisting of pH, conductivity, temperature, transmittance, urea concentration, total ammonia concentration, mineral concentration, nitrate concentration, total dissolved solids (TDS), total suspended solids (TSS), turbidity, biomass of said aquatic plants and any combination thereof. To measure these physical or chemical properties, the analysis means is selected from the group consisting of pH meter, conductivity sensor, thermometer, liquid chromatography (LC), high performance liquid chromatography (HPLC), colorimeter, turbidity meter, UV-Vis, gas chromatography (GC), mass spectrometer (MS) and any combination thereof.

Figure 2C:
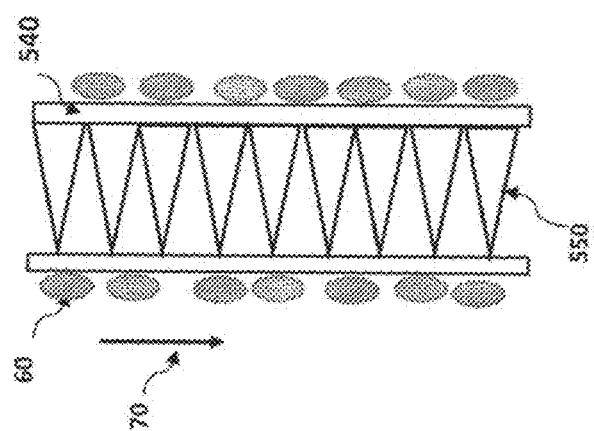
FIG. 2B shows a non-woven fabric and FIG. 2C shows a spacer fabric.
Figure 2B:
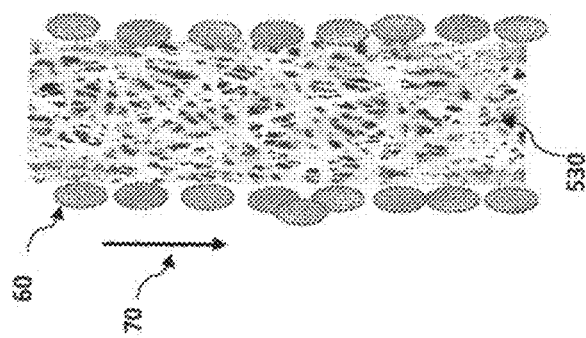
Figure 2A:
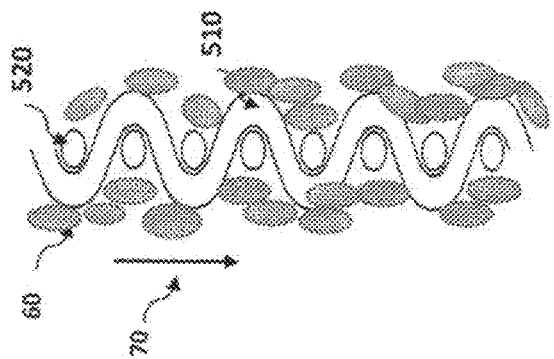
FIG. 2A shows a woven fabric.

Reference is now made to FIG. 2, which shows schematic representations of non-horizontal sheet-like substrates comprising substrate panels on which aquatic plants (60) are growing. The size of said substrate panel is 0.2 to 6 m in width and 0.2 to 6 m in height. The thickness of said substrate is in a range of 0.1 mm-20 mm. The area weight of said substrate is in a range of 20 to 500 g/m$^2$. The average pore size of said substrate is in a range of 100-2000 µm. The seeding density of said aquatic plants (60) on each side of said substrate is in a range of 100 to 2000 g/m$^2$. The substrate is selected from the group consisting of fibrous matts, nonwoven fabrics, woven fabrics, braided fabrics, warp knitted fabrics, weft knitted fabrics, netting, open cell foams, semipermeable membranes and compound structures composed of several layers of the abovementioned substrates and any combination thereof. FIG. 2A shows a woven fabric, which comprises wrap yarn (510) and fill yarn (520). FIG. 2B shows a non-woven fabric mat (530). FIG. 2C shows a spacer fabric comprising outer fabric (540) and linking filaments (550). FIG. 2D is a photo of cross section of the spacer fabric. The fiber in said substrate is selected from the group consisting of polyester, polyamide, polyolefin, cotton, rayon, bast fibers, polylactic acid, acrylic or polyurethane or mixtures thereof. The fineness of the fiber is in a range of 1 to 5000 dTex.

The invention claimed is:

1. A system for cultivating surface-growing floating aquatic plants on a non-horizontally positioned sheet-like substrate, comprising:
   a) at least one sheet-like substrate, said at least one sheet-like substrate arranged non-horizontally relative to the ground;
   b) a predetermined volume of growth media flowing through sheet-like substrate provided with a predetermined inoculum of said aquatic plants;
   c) an irrigation mechanism configured to a top down irrigation flow in said at least one sheet-like substrate; and
   d) a regulation mechanism configured to control said top down irrigation flow;
   wherein,
     said aquatic plant are *Wolffia* species;
     said at least one sheet-like substrate further comprising:
       a porous structure providing for capillary transport of water in bulk and on a surface thereof, creating a continuous surface water film;

wherein said at least one sheet-like substrate is characterized by (i) weight area of 20 to 500 gr/m$^2$, (ii) thickness of 0.1 to 20 mm, (iii) average pore size of 100-2000 μm and (iv) porosity of 0.6 to 0.98;

wherein said at least one sheet-like substrate has a wicking height of 2 mm to 150 mm and a vertical wicking rate of 0.2 to 20 mm/sec as measured by American Association of Textile Chemists and Colorists (AATCC) Test Method 197-2011; and, said irrigation mechanism is configured to provide a top down irrigation flow, the rate of said top down irrigation flow within a range of 0.5 to 10 liter/h/m$^2$;

said regulation mechanism configured to control said irrigation flow by a feedback mechanism; and, said regulation mechanism regulates the irrigation flow rate so that the aquatic plants resist the gravitational forces associated with the top down irrigation flow and stay adhered to the at least one sheet-like substrate during operation and without having any roots.

2. The system according to claim 1, wherein said *Wolffia* species are selected from the group consisting of: *Wolffia angusta, Wolffia arrhiza, Wolffia australiana, Wolffia borealis, Wolffia brasiliensis, Wolffia Columbiana, Wolffia cylindracea, Wolffia elongate, Wolffia globose, Wolffia microscopica, Wolffia neglecta* and any combination thereof.

3. The system according to claim 1, wherein said predetermined volume of growth media is the equilibrium absorption of the sheet-like substrate.

4. The system according to claim 1, wherein said irrigation mechanism supplies growth media at a rate not exceeding 10 complete equilibrium absorption volumes per hour.

5. The system according to claim 1 where the aquatic plant is seeded on the sheet-like substrate.

6. The system according to claim 1 further comprising at least one analyzing means configured to measure at least one physical or chemical property of said volume of growth media.

7. The system according to claim 6, wherein said analyzing means is connected to said volume of growth media in ways selected from the group consisting of in-line, on-line, at-line, off-line and any combination thereof.

8. The system according to claim 6, wherein said at least one analyzing means is selected from the group consisting of pH meter, conductivity sensor, thermometer, liquid chromatography (LC), high performance liquid chromatography (HPLC), colorimeter, turbidity meter, UV-Vis, gas chromatography (GC), mass spectrometer (MS) and any combination thereof.

9. The system according to claim 6, wherein said at least one physical or chemical property is selected from the group consisting of pH, conductivity, temperature, transmittance, urea concentration, total ammonia concentration, mineral concentration, nitrate concentration, total dissolved solids (TDS), total suspended solids (TSS), turbidity, biomass of said aquatic plants and any combination thereof.

10. The system according to claim 1, wherein said sheet-like substrate comprises a panel.

11. The system according to claim 10, wherein size of said substrate panel is 0.2 to 6 m in width and 0.2 to 6 m in height.

12. The system according to claim 10, wherein said substrate is selected from the group consisting of fibrous matts, nonwoven fabrics, woven fabrics, braided fabrics, warp knitted fabrics, weft knitted fabrics, netting, open cell foams, semipermeable membranes and compound structures composed of several layers of the abovementioned substrates and any combination thereof.

13. The system according to claim 12, wherein said fiber in said fabric is selected from the group consisting of are polyester, polyamide, polyolefin, cotton, rayon, bast fibers, polylactic acid, acrylic or polyurethane and any combination thereof.

14. The system according to claim 12, wherein fineness of said fiber in said substrate is in a range of 1 to 5000 dTex.

15. The system according to claim 12, wherein seeding density of said aquatic plants on each side of said fabric is in a range of 100 to 2000 g/m$^2$.

16. A method for cultivating surface-growing floating aquatic plants on a non-horizontally positioned sheet-like substrate, comprising the steps of:

a) providing at least one sheet-like substrate, said at least one sheet-like substrate arranged non-horizontally relative to the ground;

b) providing a predetermined volume of growth media flowing through sheet-like substrate provided with a predetermined inoculum of said aquatic plants;

c) providing a top down irrigation flow in said sheet-like substrate via an irrigation mechanism; and d) providing a regulation mechanism configured to control said irrigation flow;

wherein, said aquatic plants are *Wolffia* species;

said at least one sheet-like substrate further comprising:

a porous structure providing for capillary transport of water in bulk and on a surface thereof, creating a continuous surface water film;

wherein said at least one sheet-like substrate is characterized by (i) weight area of 20 to 500 gr/m$^2$, (ii) thickness of 0.1 to 20 mm, (iii) average pore size of 100-2000 μm and (iv) porosity of 0.6 to 0.98;

wherein said at least one sheet-like substrate has a wicking height of 2 mm to 150 mm and a vertical wicking rate of 0.2 to 20 mm/sec as measured by American Association of Textile Chemists and Colorists (AATCC) Test Method 197-2011; and, said irrigation mechanism is configured to provide a top down irrigation flow, the rate of said top down irrigation flow within a range of 0.5 to 10 liter/h/m$^2$;

said regulation mechanism configured to control said irrigation flow by a feedback mechanism; and, said regulation mechanism regulates the irrigation flow rate so that the aquatic plants resist the gravitational forces associated with the top down irrigation flow and stay adhered to the at least one sheet-like substrate during operation and without having any roots.

17. The method according to claim 16, wherein said *Wolffia* species is selected from the group consisting of: *Wolffia angusta, Wolffia arrhiza, Wolffia australiana, Wolffia borealis, Wolffia brasiliensis, Wolffia Columbiana, Wolffia cylindracea, Wolffia elongate, Wolffia globose, Wolffia microscopica, Wolffia neglecta* and any combination thereof.

18. The method according to claim 16, wherein said predetermined volume of growth media is the equilibrium absorption of the sheet-like substrate.

19. The method according to claim 16, wherein said irrigation mechanism supplies growth media at a rate not exceeding 10 complete equilibrium absorption volumes per hour.

20. The method according to claim 16, wherein the aquatic plant is seeded on the sheet like substrate.

21. The method according to claim 20, wherein time between seeding and harvesting of said aquatic plants is in a range of 2 to 30 days.

22. The method according to claim 16, further comprising a step of providing at least one analyzing means to measure at least one physical or chemical property of said volume of growth media.

23. The method according to claim 22, wherein said analyzing means is connected to said volume of growth media in ways selected from the group consisting of in-line, on-line, at-line, off-line and any combination thereof.

24. The method according to claim 22, wherein said at least one analyzing means is selected from the group consisting of pH meter, conductivity sensor, thermometer, liquid chromatography (LC), high performance liquid chromatography (HPLC), colorimeter, turbidity meter, UV-Vis, gas chromatography (GC), mass spectrometer (MS) and any combination thereof.

25. The method according to claim 22, wherein said at least one physical or chemical property is selected from the group consisting of pH, conductivity, temperature, transmittance, urea concentration, total ammonia concentration, mineral concentration, nitrate concentration, total dissolved solids (TDS), total suspended solids (TSS), turbidity, biomass of said aquatic plants and any combination thereof.

26. The method according to claim 16, wherein said sheet-like substrate comprises a panel.

27. The method according to claim 26, wherein size of said substrate panel is 0.2 to 6 m in width and 0.2 to 6 m in height.

28. The method according to claim 26, wherein said substrate is selected from the group consisting of fibrous matts, nonwoven fabrics, woven fabrics, braided fabrics, warp knitted fabrics, weft knitted fabrics, netting, open cell foams, semipermeable membranes and compound structures composed of several layers of the abovementioned substrates and any combination thereof.

29. The method according to claim 28, wherein said fiber in said fabric is selected from the group consisting of polyester, polyamide, polyolefin, cotton, rayon, bast fibers, polylactic acid, acrylic or polyurethane and any combination thereof.

30. The method according to claim 28, wherein fineness of said fiber in said fabric is in a range of 1 to 5000 dTex.

31. The method according to claim 28, wherein seeding density of said aquatic plants on each side of said fabric is in a range of 100 to 2000 $g/m^2$.

\* \* \* \* \*